United States Patent
El-Wardany et al.

(10) Patent No.: US 11,415,210 B2
(45) Date of Patent: Aug. 16, 2022

(54) STRUCTURED MATERIAL ALLOY COMPONENT FABRICATION

(71) Applicant: United Technologies Corporation, Farmington, CT (US)

(72) Inventors: Tahany Ibrahim El-Wardany, Vernon, CT (US); Aaron T. Nardi, East Granby, CT (US); Daniel V. Viens, North Hero, VT (US); Wenjiong Gu, Glastonbury, CT (US); Eric J. Amis, Hartford, CT (US); Hayden M. Reeve, West Hartford, CT (US)

(73) Assignee: Raytheon Technologies Corporation, Farmington, CT (US)

(*) Notice: Subject to any disclaimer, the term of this patent is extended or adjusted under 35 U.S.C. 154(b) by 205 days.

(21) Appl. No.: 16/815,502

(22) Filed: Mar. 11, 2020

(65) Prior Publication Data
US 2020/0208726 A1   Jul. 2, 2020

Related U.S. Application Data

(62) Division of application No. 14/763,896, filed as application No. PCT/US2013/023428 on Jan. 28, 2013, now Pat. No. 10,626,974.

(51) Int. Cl.
*F16H 55/06* (2006.01)
*B33Y 10/00* (2015.01)
(Continued)

(52) U.S. Cl.
CPC .......... *F16H 55/06* (2013.01); *B22F 3/02* (2013.01); *B22F 3/24* (2013.01); *B22F 5/08* (2013.01);
(Continued)

(58) Field of Classification Search
CPC .... F16H 55/06; F16H 55/17; F16H 2055/065; B22F 10/10; B22F 7/06; B22F 3/02;
(Continued)

(56) References Cited

U.S. PATENT DOCUMENTS 2,445,583 A * 7/1948 Moroco ............. B22D 19/0036
164/92.1
4,917,743 A * 4/1990 Gramberger .......... F16D 23/025
156/89.11

(Continued)

FOREIGN PATENT DOCUMENTS

| CH | 707326 A2 * | 12/2012 | ............ C25C 1/00 |
|---|---|---|---|
| WO | 9722819 A1 | 6/1997 | |
| WO | 2009109016 A1 | 9/2009 | |

OTHER PUBLICATIONS

Australian Office Action dated Nov. 2, 2018 issued for corresponding Australian Patent Application No. 2017265161.
(Continued)

*Primary Examiner* — Rick K Chang
(74) *Attorney, Agent, or Firm* — Bachman & LaPointe, P.C.

(57) ABSTRACT

A novel manufacturing method for functionally graded component includes a cold sprayed additive manufactured core material and a cold sprayed additive manufactured set of teeth around said core made from another material.

7 Claims, 5 Drawing Sheets

(51) Int. Cl.
| | |
|---|---|
| B23P 15/14 | (2006.01) |
| B22F 3/02 | (2006.01) |
| B22F 3/24 | (2006.01) |
| B22F 7/02 | (2006.01) |
| C23C 26/00 | (2006.01) |
| C23C 28/02 | (2006.01) |
| C21D 6/00 | (2006.01) |
| F16H 55/17 | (2006.01) |
| B33Y 80/00 | (2015.01) |
| B22F 5/08 | (2006.01) |
| C21D 9/32 | (2006.01) |
| B22F 7/06 | (2006.01) |
| C23C 24/04 | (2006.01) |
| B22F 10/10 | (2021.01) |

(52) U.S. Cl.
CPC .............. *B22F 7/02* (2013.01); *B22F 7/06* (2013.01); *B22F 10/10* (2021.01); *B23P 15/14* (2013.01); *B33Y 10/00* (2014.12); *B33Y 80/00* (2014.12); *C21D 6/00* (2013.01); *C21D 9/32* (2013.01); *C23C 24/04* (2013.01); *C23C 26/00* (2013.01); *C23C 28/021* (2013.01); *F16H 55/17* (2013.01); *B22F 2003/248* (2013.01); *B22F 2998/10* (2013.01); *B22F 2999/00* (2013.01); *C21D 2221/10* (2013.01); *F16H 2055/065* (2013.01); *Y10T 74/19949* (2015.01)

(58) Field of Classification Search
CPC ...... B22F 3/24; B22F 7/02; B22F 5/08; B22F 2999/00; B22F 2998/10; B22F 2003/248; B23P 15/14; C23C 24/04; C23C 26/00; C23C 28/021; C21D 6/00; C21D 9/32; C21D 2221/10; B33Y 80/00; B33Y 10/00; Y10T 74/19949; Y02P 10/25
See application file for complete search history.

(56) References Cited

U.S. PATENT DOCUMENTS

| | | | | |
|---|---|---|---|---|
| 4,931,117 | A * | 6/1990 | Muller | B22F 7/08 156/245 |
| 5,302,414 | A * | 4/1994 | Alkhimov | B05B 7/144 427/191 |
| 5,879,743 | A * | 3/1999 | Revankar | B22F 7/04 427/191 |
| 6,014,807 | A * | 1/2000 | O | B22F 7/06 29/893.37 |
| 6,148,685 | A | 11/2000 | Cadle et al. | |
| 6,176,635 | B1 * | 1/2001 | Rank | F16D 23/025 192/53.34 |
| 6,471,800 | B2 * | 10/2002 | Jang | B29C 64/40 156/58 |
| 6,905,728 | B1 * | 6/2005 | Hu | B22F 7/08 427/140 |
| 7,967,924 | B2 | 6/2011 | Groh et al. | |
| 8,261,444 | B2 | 9/2012 | Calla et al. | |
| 8,293,035 | B2 * | 10/2012 | Zurecki | C23C 10/02 148/511 |
| 9,033,835 | B2 * | 5/2015 | Blank | F16H 55/30 474/152 |
| 9,566,671 | B2 * | 2/2017 | Chavdar | B23P 15/14 |
| 9,673,381 | B2 * | 6/2017 | Wang | C23C 4/06 |
| 9,700,957 | B1 * | 7/2017 | Burgess | B23K 20/227 |
| 9,995,355 | B2 * | 6/2018 | Hassler | F16D 25/0632 |
| 2009/0148622 | A1 * | 6/2009 | Stoltenhoff | B23P 6/00 427/554 |
| 2011/0223053 | A1 | 9/2011 | Jahedi et al. | |
| 2014/0115854 | A1 * | 5/2014 | Widener | B64F 5/40 29/402.18 |
| 2014/0202595 | A1 * | 7/2014 | Hofmann | C23C 4/134 148/522 |
| 2015/0044084 | A1 * | 2/2015 | Hofmann | B32B 15/013 419/7 |

OTHER PUBLICATIONS

European Office Action dated May 11, 2018 issued for corresponding European Patent Application No. 13872443.0.

J. Tiley et al.; Coarsening Kinetics of Gamma Precipitates in the Commercial Nickel Base Superalloy Rene 88 DT; Acta Materialia 57.8: pp. 2538-2549; Mar. 18, 2009; http://144.206.159.178/FT/12/607406/14839543.pdf.

Mehdi Bayat et al.; Mechanical and Thermal Stresses in a Functionally Graded Rotating Disk With Variable Thickness Due To Radially Symmetry Loads; International Journal of Pressure Vessels and Piping 86.6 (2009); pp. 357-372.

* cited by examiner

STRUCTURED MATERIAL ALLOY COMPONENT FABRICATION

CROSS-REFERENCE TO RELATED APPLICATIONS

The instant application is a divisional application of U.S. patent application Ser. No. 14/763,896 filed Jul. 28, 2015, which is a 371 of International Application No. PCT/US2013/023428 filed Jan. 28, 2013.

BACKGROUND

The present disclosure relates generally to powdered additive manufacturing applications of functionally graded structure and materials.

Gear manufacturing is one of the most complicated manufacture processes. The selection of gear materials require controlled hardenability, minimal non-metallic inclusions especially oxides, good formability for better forge die life and consistency of forge quality, good machinability, low quench distortion and minimal grain growth during high temperature carburization. Gear steel processes and chemical compositions that reduce inter-granular oxidation through the development of secondary refining are also relatively expensive.

To produce one gear, wide ranges of operations of between 50 to 160 steps are often required dependent on the application, e.g., general or aerospace. Current gear manufacture processes, such as casting, extrusion, or forging, in addition to carburization, heat treatments and machining may require relatively high energy consumption, high tooling cost for initial production and relatively long lead times for the raw material

SUMMARY

A component according to one disclosed non-limiting embodiment of the present disclosure includes a cold sprayed additive manufactured core and a cold sprayed additive manufactured set of teeth around the core.

A further embodiment of the foregoing embodiment of the present disclosure wherein the core is manufactured of a carbon steel alloy powder.

In the alternative or additionally thereto, the foregoing embodiment wherein the set of teeth is manufactured of a tool steel alloy powder.

A further embodiment of any of the foregoing embodiments, of the present disclosure wherein the core and the set of teeth are manufactured as a near net shape.

A further embodiment of any of the foregoing embodiments, of the present disclosure wherein the set of teeth is manufactured of a tool steel alloy powder.

A further embodiment of any of the foregoing embodiments, of the present disclosure wherein the component is a gear.

In the alternative or additionally thereto, the foregoing embodiment wherein the gear is at least partially hollow.

A method of manufacturing a component according to one disclosed non-limiting embodiment of the present disclosure includes spraying a powdered metal to form an additive manufactured core; and spraying a powdered metal to form an additive manufactured set of teeth around the core.

A further embodiment of the foregoing embodiment of the present disclosure includes cold spraying the powdered metal to form the additive manufactured core onto a substrate.

In the alternative or additionally thereto, the foregoing embodiment includes removing the substrate.

In the alternative or additionally thereto, the foregoing embodiment includes spraying the powdered metal to accelerate and plastically deform the powdered metal.

In the alternative or additionally thereto, the foregoing embodiment includes generating high strain rate plasticity.

In the alternative or additionally thereto, the foregoing embodiment includes spraying the powdered metal via a cold spray system.

In the alternative or additionally thereto, the foregoing embodiment includes heat-treating the additive manufactured set of teeth.

In the alternative or additionally thereto, the foregoing embodiment includes final machining the additive manufactured set of teeth.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 5 represent the conventional RELATED ART design of an aerospace gear; and.

DETAILED DESCRIPTION

Figure 1:
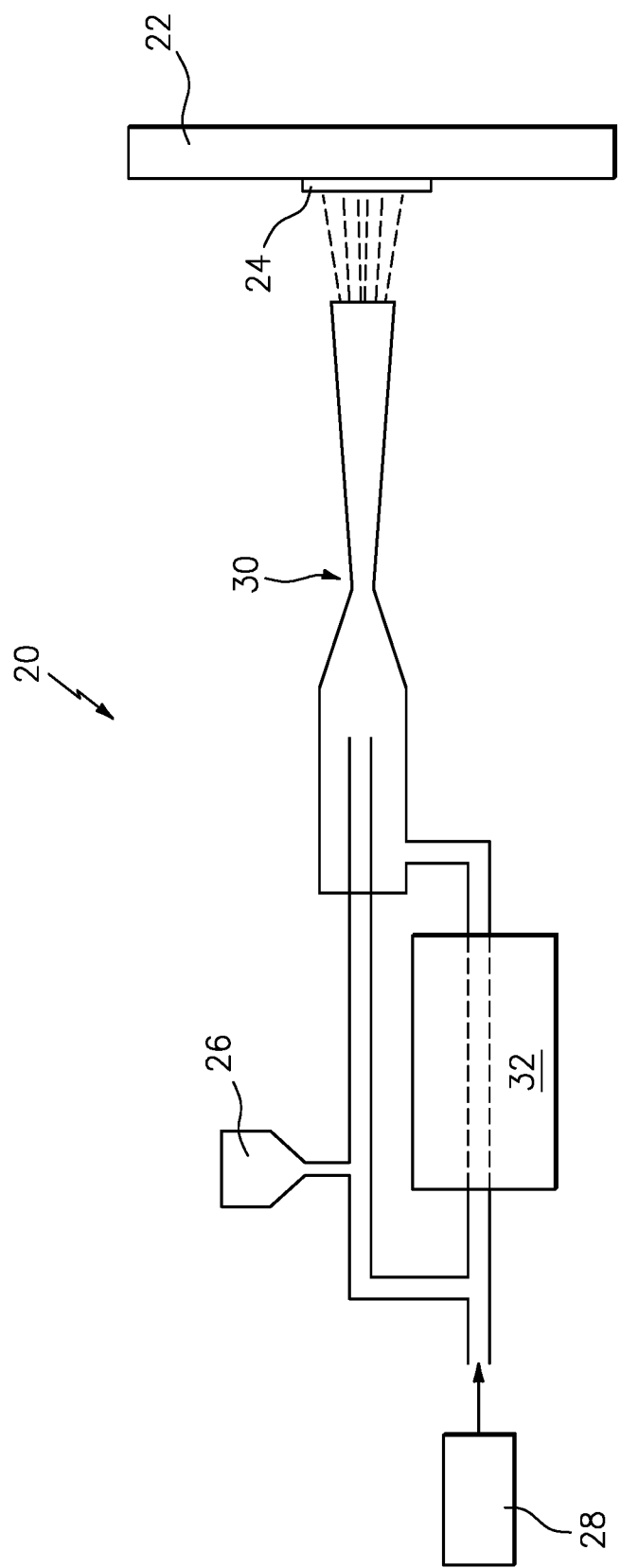
FIG. 1 is a general schematic view of an exemplary cold spray system.

FIG. 1 schematically illustrates a cold spray system 20 that is utilized to produce dense powdered metal components that incorporate high levels of work into the process of densification. Cold gas-dynamic spraying (cold spray) may be utilized as an Additive Manufacturing (AM) process. Significantly higher strength through recrystallization and microstructure refinement is provided via the cold spray system 20 as other powder processes cannot produce the level of working and thus the mechanical properties of this process. One example cold spray system 20 is that manufactured by, for example, Sulzer Metco Kinetiks™ 4000 Cold Spray Gun.

Figure 2:
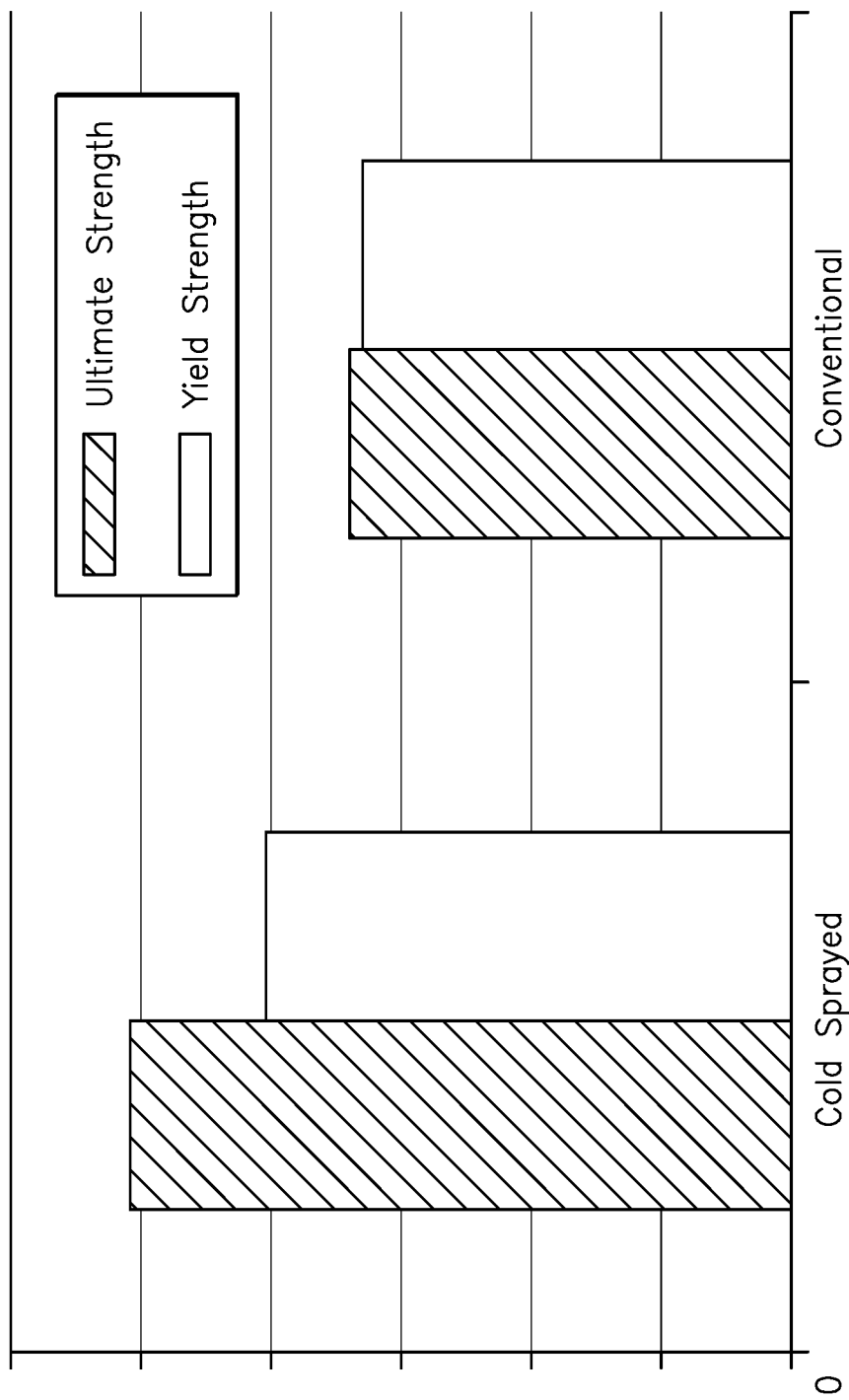
FIG. 2 is an comparison between a cold sprayed additive manufacturing component and an equivalent conventional wrought component.

The cold spray system 20 exposes a metallic substrate 22 to a high velocity 671-3355 mph (300-1500 m/s) jet of relatively small 0.00004-0.0039 inches (1-100 μm) powdered metal particles accelerated by a supersonic jet of compressed gas. The cold spray system 20 accelerates the powdered metals toward the substrate such that the powdered metal particles deform on impact to generate high strain rate plasticity. This plasticity works the powdered metals, densifies the structure, and due to the high strain rate of the process, recrystallizes nano-grains in the deposited material. Experiments have shown that a component produced through this cold spray process may exhibits strength in excess of an equivalent wrought counterpart (FIG. 2).

The cold spray process disclosed herein selects the combination of particle temperature, velocity, and size that allows spraying at a temperature far below the melting point of the powdered metals which results in a layer 24 of particles in their solid state. The cold spray system 20 also offers significant advantages that minimize or eliminate the deleterious effects of high-temperature oxidation, evaporation, melting, crystallization, residual stresses, de-bonding, gas release, and other common problems of other additive manufacturing methods yet provides strong bond strength on coatings and substrates.

In one disclosed non-limiting embodiment, the powdered metal may include one or more various ductile metals 26 such as Copper, Aluminum, steel alloys or others that plastically deform. The prime mover of the cold spray system 20 is an inert or semi-inert carrier gas 28 such as Helium, Nitrogen or Krypton that is non-oxidizing to the powdered metal particles.

The velocity of the spray is inversely proportional to the molecular mass of the gas 28 such that a mixture of gasses may also be utilized to further control resultant temperatures and particle velocity. Generally, the desired velocity is great enough to break the oxide film on the powdered metal particles yet remain below the speed of sound through a convergent divergent nozzle 30. Furthermore, the temperature of the gas readily affects the velocity at which the speed of sound is reached. For example, a cold gas reaches the speed of sound at approximately 805 mph (360 m/s) while the same gas at approximately 1470 F (800 C) may be propelled at approximately 1118 mph (500 m/s). In one example, the carrier gas may be heated to temperatures of approximately 1470 F (800 C) with heater 32.

The cold spray system 20 may be used as an Additive Manufacturing process to produce higher strength, lighter weight and consolidated components such as gear and shaft components through the layered deposition of powdered metals. It should be understood that although particular component types are illustrated in the disclosed non-limiting embodiment, other components will also benefit herefrom.

The cold spray system 20 facilitates additive manufacturing through the deposition of powdered metals of multiple materials. The additive manufactured component may then be readily heat treated, and machined to final shape.

Figure 3:
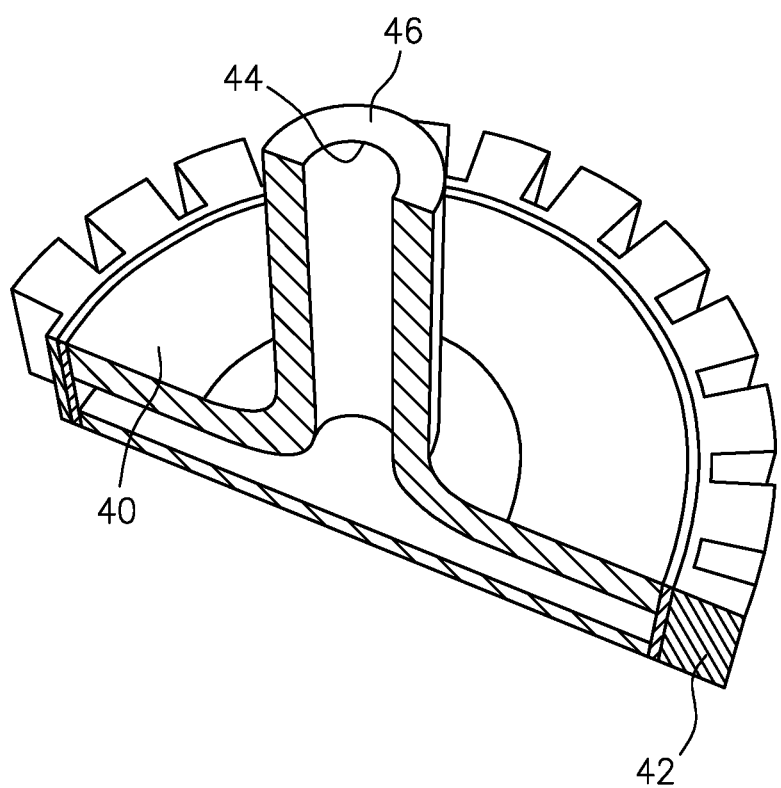
FIG. 3 is a partial sectional view of a cold sprayed additive manufacturing component that is manufactured with low alloy steel and tool steel outer layer.

With reference to FIG. 3, in one disclosed non-limiting embodiment, two or more different powdered metals may be utilized. For example only, a core 40 of a gear or shaft may be manufactured with low carbon steel alloy powder to provide high bending fatigue resistance, while an outer surface 42 such as gear teeth may be manufactured with a tool steel alloy powder to provide high wear resistance and high surface hardness. The additive manufactured near net shape may then be heat treated and machined in its hardened state to a final profile.

An interface between the core 40 and the outer surface 42 need not be consistent. That is, the interface between the core 40 and the outer surface 42 may be delineated in response to expected loads, weight or other variables.

Figure 4:
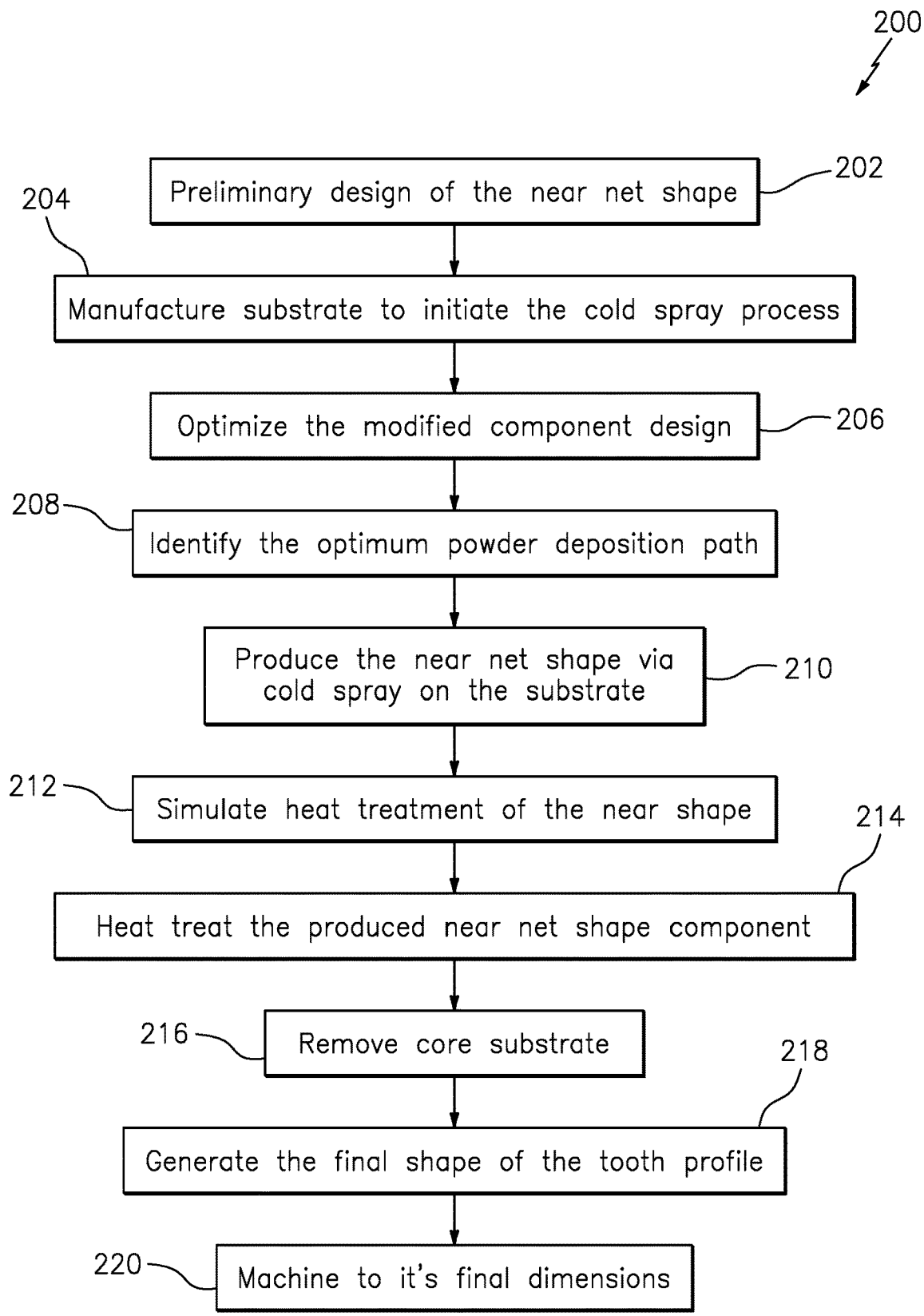
FIG. 4 is a flow diagram of an integrated design/additive manufacturing approach to produce an additively manufactured functionally graded gear according to one disclosed non-limiting embodiment.

With reference to FIG. 4, a cold spray additive manufacture process 200 to additive manufacture a component is schematically illustrated. The additive manufacturing process constructs a component layer by layer from powdered metal. The powdered metal of each layer may be consolidated either by diffusion through melting via, for example, a laser or electron beam, or are bonded through plastic deformation of both substrate and powder metal particle layers that provide intimate conformal contact from the high local pressures generated by the cold spray system 20.

Initially, a preliminary design of a near net shape component is proposed (Step 202). That is, models are developed to optimize the near net shape component design to be manufactured with cold spray additive manufacturing.

A substrate 44 (FIG. 3) is manufactured to provide, for example, a mandrel-like shape to initiate the cold spray process. The substrate may, for example, provide an outer diameter that becomes a gear shaft inner diameter of the near net shape component (Step 204).

Figure 6:
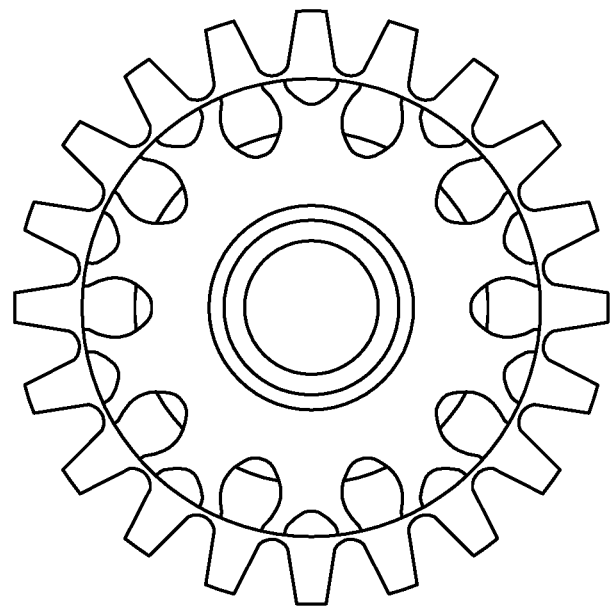
FIG. 6 represent the gear of FIG. 5 after utilizing topology optimization method to reduce weight without sacrificing.
Figure 5:
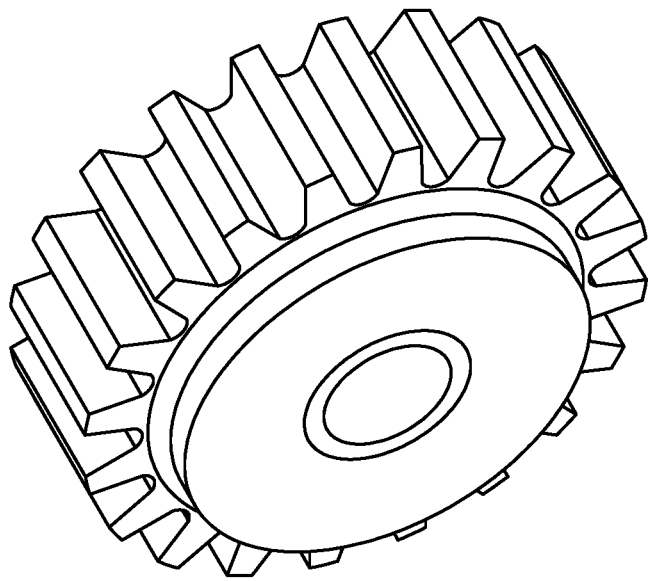

The near net shape component design may then be optimized with, for example, OptiStruct Topology optimization software manufactured by Altair Engineering, Inc. The optimization constraints may include a 25% increase in the material mechanical properties, increased surface resistance to fatigue and wear with a stronger material such as tool steel, reduce component weight without stress state increase and enhanced performance. One example output of the optimization analysis is to reduce weight of a near net shape gear (RELATED ART; FIG. 5) (Step 206; FIG. 6). Another optimization analysis may be directed to a low cost gear. A third optimization analysis may be directed to increase the fatigue strength of the near net shape component.

After near net shape component design optimization, finite element modeling of the cold spray process (modeling of the multiple splats deposition) may be used to optimize the process parameters such as powdered material initial temperature, critical velocity, and powder size to facilitate cold spraying at a temperature below the melting point of the metal materials. The desired velocity is greater than the critical velocity necessary to achieve a successful deposition in their solid state.

Models may then be used to identify the optimum powder deposition path for each material to insure proper bonding of the particles (Step 208). This model may also be used to support the selection of nozzle 30 geometry to increase the efficiency of the deposition process. The near net shape is then produced via the cold spray process on the substrate (Step 210).

The heat treatment of the near net shape may also be simulated with finite element analysis to define the heating temperature and cooling rate for the selected carbon steel and tool steel material properties (Step 212).

The produced near net shape component is then heat treated to achieve the required properties (Step 214). No carburization heat treatment cycle is required since tool steel material is utilized at the tooth surface.

The core substrate 44 is then melted and removed (Step 216). That is, the substrate 44 upon which the cold spray additive manufacturing is initiated is removed.

Optimum machining parameters and cutter paths are then identified to generate the final tooth profile (Step 218). Because the surface hardness after heat treatment is greater than 60 Rc in the disclosed non-limiting embodiment, the final process is to use hard turning technologies and ceramic or cubic boron nitride tools to machine the gear teeth to the final profile. The shaft 46 (FIG. 3) may then be machined to final dimensions (Step 220).

Following this methodology, a cold spray additive manufacturing component has shown an increase in both ultimate tensile strength and yield by approximately 20%.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed in the illustrated embodiment, other arrangements will benefit herefrom.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A component comprising:
   a cold sprayed additive manufactured core material, the core material having a mandrel shape center defining a gear shaft inner diameter; and
   a cold sprayed additive manufactured set of teeth of different material around said core material, wherein said core is manufactured of a carbon steel alloy powder.

2. The component as recited in claim 1, wherein said set of teeth is manufactured of a tool steel alloy powder.

3. The component as recited in claim 1, wherein said component is a gear.

4. The component as recited in claim 3, wherein said gear is at least partially hollow.

5. A component comprising:
   a cold sprayed additive manufactured core material, the core material having a mandrel shape center defining a gear shaft inner diameter; and
   a cold sprayed additive manufactured set of teeth of different material around said core material, wherein said core and said set of teeth are manufactured as a near net shape.

6. A component comprising:
   a cold sprayed additive manufactured core material, the core material having a mandrel shape center defining a gear shaft inner diameter; and
   a cold sprayed additive manufactured set of teeth of different material around said core material, wherein said set of teeth is manufactured of a tool steel alloy powder.

7. The component as recited in claim 6, wherein said core is manufactured of a carbon steel alloy powder.

* * * * *